United States Patent
Ferlitsch

(10) Patent No.: US 7,265,860 B2
(45) Date of Patent: Sep. 4, 2007

(54) LOAD BALANCING PRINT JOBS ACROSS MULTIPLE PRINTING DEVICES

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 973 days.

(21) Appl. No.: 10/396,201

(22) Filed: Mar. 25, 2003

(65) Prior Publication Data

US 2003/0184799 A1 Oct. 2, 2003

Related U.S. Application Data

(63) Continuation-in-part of application No. 09/964,985, filed on Sep. 26, 2001, which is a continuation-in-part of application No. 09/894,928, filed on Jun. 28, 2001, which is a continuation-in-part of application No. 09/681,409, filed on Mar. 30, 2001, now abandoned, and a continuation-in-part of application No. 09/681,416, filed on Mar. 30, 2001, now Pat. No. 7,046,384, which is a continuation-in-part of application No. 09/681,208, filed on Feb. 22, 2001.

(60) Provisional application No. 60/261,132, filed on Jan. 11, 2001.

(51) Int. Cl.
*G06F 15/00* (2006.01)
(52) U.S. Cl. .................................... 358/1.15; 358/1.13
(58) Field of Classification Search ........... 358/1.1–1.9
See application file for complete search history.

(56) References Cited

U.S. PATENT DOCUMENTS

| | | | | |
|---|---|---|---|---|
| 6,348,971 B2 * | 2/2002 | Owa et al. ................. 358/1.15 |
| 6,529,286 B1 * | 3/2003 | King ........................ 358/1.14 |
| 6,654,509 B2 * | 11/2003 | Nishikawa et al. ......... 382/298 |
| 6,661,531 B1 * | 12/2003 | Murphy et al. ............ 358/1.15 |
| 7,031,014 B2 * | 4/2006 | Ohwa ....................... 358/1.18 |
| 7,139,085 B1 * | 11/2006 | Sakaguchi ................ 358/1.15 |

* cited by examiner

*Primary Examiner*—Douglas Q. Tran
*Assistant Examiner*—Chan S. Park
(74) *Attorney, Agent, or Firm*—Michael F. Krieger; Kirton & McConkie

(57) ABSTRACT

Systems and methods for providing a time-to-availability attribute for use in a variety of printing environments to dynamically manage the load balancing of print jobs across multiple printing devices, wherein the attribute is supported on the client side, on the server side or by printer firmware, and wherein the attribute is implemented in a printer driver, a print processor, a spooler, a print server, a printer firmware spooler, or another component of a print subsystem. Job information and heuristic information are obtained to facilitate the load balancing of each print job and are stored separately from the print data. The job information includes information for estimating the amount of time to render a particular print job on a specified printer. The heuristic information includes accumulative information for estimating the actual performance of the printer under various print modes. The time-to-availability attribute for each printer may be used in both cluster printing and intelligent routing to load balance print jobs, wherein the print jobs are balance across a group of printers to produce a maximum throughput and minimum time to completion.

21 Claims, 8 Drawing Sheets

LOAD BALANCING PRINT JOBS ACROSS MULTIPLE PRINTING DEVICES

RELATED APPLICATIONS

This application is a continuation-in-part (CIP) of U.S. patent application Ser. No. 09/964,985, filed Sep. 26, 2001, entitled "METHODS AND SYSTEMS FOR PRINTING DEVICE LOAD BALANCING," invented by Andrew Rodney Ferlitsch, et al., which is a continuation-in-part (CIP) of U.S. patent application Ser. No. 09/894,928, filed Jun. 28, 2001, entitled "METHODS AND SYSTEMS FOR PAGE-INDEPENDENT SPOOL FILE SHEET ASSEMBLY," invented by Andrew Rodney Ferlitsch, et al., which is a continuation-in-part (CIP) of two U.S. patent applications; U.S. patent application Ser. No. 09/681,409, filed Mar. 30, 2001, entitled "METHODS AND SYSTEMS FOR PRINT-PROCESSOR-BASED PRINTER STATUS DETECTION AND PRINT TASK DISTRIBUTION," invented by Andrew Rodney Ferlitsch, et al., now abandoned; and U.S. patent application Ser. No. 09/681,416, filed Mar. 30, 2001, entitled "METHODS AND SYSTEMS FOR PRINT-PROCESSOR-BASED PRINT TASK ERROR RECOVERY," invented by Andrew Rodney Ferlitsch, et al., now U.S. Letters Pat. No. 7,046,384; both of which are continuation-in-part patent applications of U.S. patent application Ser. No. 09/681,208, filed Feb. 22, 2001, entitled "METHODS AND SYSTEMS FOR PRINT-PROCESSOR-MODIFIED PRINTING," invented by Andrew Rodney Ferlitsch, et al, which claims the benefit of U.S. Provisional Patent Application Ser. No. 60/261,132, entitled "METHODS AND SYSTEMS FOR PRINT-PROCESSOR-MODIFIED PRINTING," invented by Andrew Rodney Ferlitsch, et al., filed Jan. 11, 2001.

BACKGROUND OF THE INVENTION

1. Field of the Invention

The present invention relates to load balancing print jobs across multiple printing devices. In particular, the present invention relates to systems and methods for providing a time-to-availability attribute for use in a variety of printing environments to dynamically manage the load balancing of print jobs across multiple printing devices, wherein the attribute is supported on the client side, on the server side, or by printer firmware, and wherein the attribute is implemented in a printer driver, a print processor, a spooler, a print server, a printer firmware spooler, or another component of a print subsystem.

2. Background and Related Art

When a user sends a print job to a specific printer and that printer is busy, the user is typically required to wait for a period of time prior to the printer being able to process the print job that the user sent. This required waiting period occurs even when another compatible printer on the network may be available. While a number of techniques have attempted to address the problem, none have solved the problem completely.

For example, one attempt to address the problem includes a printing environment wherein the user is able to split a print job across several networked printers. This process is typically referred to as employing a "printer cluster," where each printer device prints a portion of the print job sent by the user. While this alternative has been made available, it also presents various problems for the user. For example, if one or more of the printers of the printer cluster are busy, the user may be required to wait a longer period of time for the entire print job to be processed than would be otherwise expected.

Another attempt to address the problem of having to wait for print jobs to be processed is through the use of "printer pooling." On some operating systems, the user is able to group a set of compatible printers together as a printer pool. Once the printer pool is established, print jobs are sent to printers of the printer pool in a round robin fashion. For example, if three printers are in the printer pool and six print jobs are sent for processing, a first print job would be sent to a first printer of the printer pool, a second print job would be sent to a second printer of the printer pool, a third print job would be sent to a third printer of the printer pool, a fourth print job would be sent to the first printer of the printer pool, a fifth print job would be sent to the second printer of the printer pool, and a sixth print job would be sent to the third printer of the printer pool. While this technique is available, it suffers for a variety of reasons, including that the round robin assigning of print jobs to printers of a printer cluster can still cause a log jam to occur that requires one or more users to wait for the processing of their print job.

In another technique, new attributes are created for the number of jobs at a given printer and the maximum number of jobs that can be queued to a given printer. While this technique improves the printer pooling method by maintaining an even balance of jobs across a group of printers, it still suffers in a variety of manners, including that the new attributes can still cause a log jam to occur that requires one or more users to wait for the processing of their print job.

In another technique, the availability of each printer in a printer group (i.e., printer cluster) is considered to address the problem. Each printer and/or printer queue is queried to obtain the status of the printer and preferences are given to the printers that are the most available at a current moment. While this technique is available, the technique can still cause a logjam to occur that requires one or more users to wait for the processing of their print job.

In another technique, the printing devices are queried for their pages per minute speeds and preference is given to the faster printers of otherwise equal availability. While an improvement over other techniques, this technique still suffers in that it is assumed that each printer runs at its maximum pages per minute speed and does not take into account that the pages per minute speed typically varies depending on whether the printer data is rasterized, on the amount of data per page, and on the sheet assembly options, such as duplex.

Thus, while techniques currently exist that are used in association with processing a print job, challenges still exist, including causing a log jam to occur among print jobs that requires one or more users to wait for the processing of their print job. Accordingly, it would be an improvement in the art to augment or even replace current techniques with other techniques.

SUMMARY OF THE INVENTION

The present invention relates to load balancing print jobs across multiple printing devices. In particular, the present invention relates to systems and methods for providing a time-to-availability attribute for use in a variety of printing environments to dynamically manage the load balancing of print jobs across multiple printing devices, wherein the attribute is supported on the client side, on the server side, or by printer firmware, and wherein the attribute is implemented in a printer driver, a print processor, a spooler, a print server, a printer firmware spooler, or another component of a print subsystem.

Implementation of the present invention takes place in association with one or more print jobs that have been initiated for processing. In at least one implementation, load balancing of one or more print jobs is performed across multiple printing devices in a local printing environment. The print jobs are typically initiated from an application. Alternatively, the print jobs may be initiated by an automated or background process. Upon initiation, a user indicates an intention to despool the print data to one or more printing devices.

The time-to-availability attribute for each printer is used in both cluster printing and intelligent routing to load balance print jobs, wherein the print jobs are balance across a group of printers to produce a maximum throughput and minimum time to completion.

During initiation, the user chooses to despool one or more print jobs to one or more local printing devices. In a local printing environment, a plurality of printing devices may be connected to a computer device via two or more bi-directional parallel ports or as a chain of printers on a single bi-directional parallel port. Other examples may include multiple serial ports and SCSI ports.

A printer driver that is associated with the printing device (s) generates the print data. The printer driver may generate journaled data (e.g., EMF) for deferred rendering (i.e., playback), PDL (e.g., Postcript, PCL, PDF) for deferred rendering (i.e., firmware interpretation), or rasterised (i.e., ready for the printer's marking engine).

The printer driver spools the print data to a spooler for immediate or later despooling. The spooler despools the print data to a print processor. If the print data is rendered data (either raster or PDL), the print processor writes the print data directly to the port manager(s) of the associated printer(s). If the print data is journaled data, the print processor plays back the journaled data to the printer driver to render into printer data. The printer driver then spools the printer ready data to the spooler, which writes the printer ready data directly to the port manager(s) of the associated printer(s).

In at least the present implementation, the printer driver produces additional information about each print job to facilitate the load balancing of each print job. This information is stored separately from the print data. The printer driver also maintains heuristic information (i.e., accumulative statistical information for estimating subsequent print jobs). The job information contains information for estimating the amount of time to render the print job on a specified printer. The heuristic information includes accumulative information for estimating the actual performance of the printer under various print modes, such as journaled, PDL and rasterized data, simplex and duplex printing and average data size per page.

The printer driver uses the accumulative performance information about the specified printer(s), the characteristics of the print job, the current status of the printer(s), and the current status of the print job(s) despooled/queued to the printer(s) to determine the most optimal load balance amongst a group of printers.

While the methods and processes of the present invention have proven to be particularly useful in the area of load balancing print jobs across multiple printing devices in a local printing environment, those skilled in the art will appreciate that the methods and processes of the present invention can be used in a variety of different printing environments, including in a shared network printing environment, in a remote printing environment, and other types of printing environments. Moreover, those skilled in the art will appreciate that the methods and processes of the present invention may be performed in a variety of different operating systems to enable load balancing of print jobs across multiple printing devices.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to load balancing print jobs across multiple printing devices. In particular, the present invention relates to systems and methods for providing a time-to-availability attribute for use in a variety of printing environments to dynamically manage the load balancing of print jobs across multiple printing devices, wherein the attribute is supported on the client side, on the server side, or by printer firmware, and wherein the attribute is implemented in a printer driver, a print processor, a spooler, a print server, a printer firmware spooler, or another component of a print subsystem.

The following disclosure of the present invention is grouped into two subheadings, namely "Exemplary Operating Environment" and "Providing Load Balancing of Print Jobs." The utilization of the subheadings is for convenience of the reader only and is not to be construed as limiting in any sense.

Exemplary Operating Environment

Figure 1:
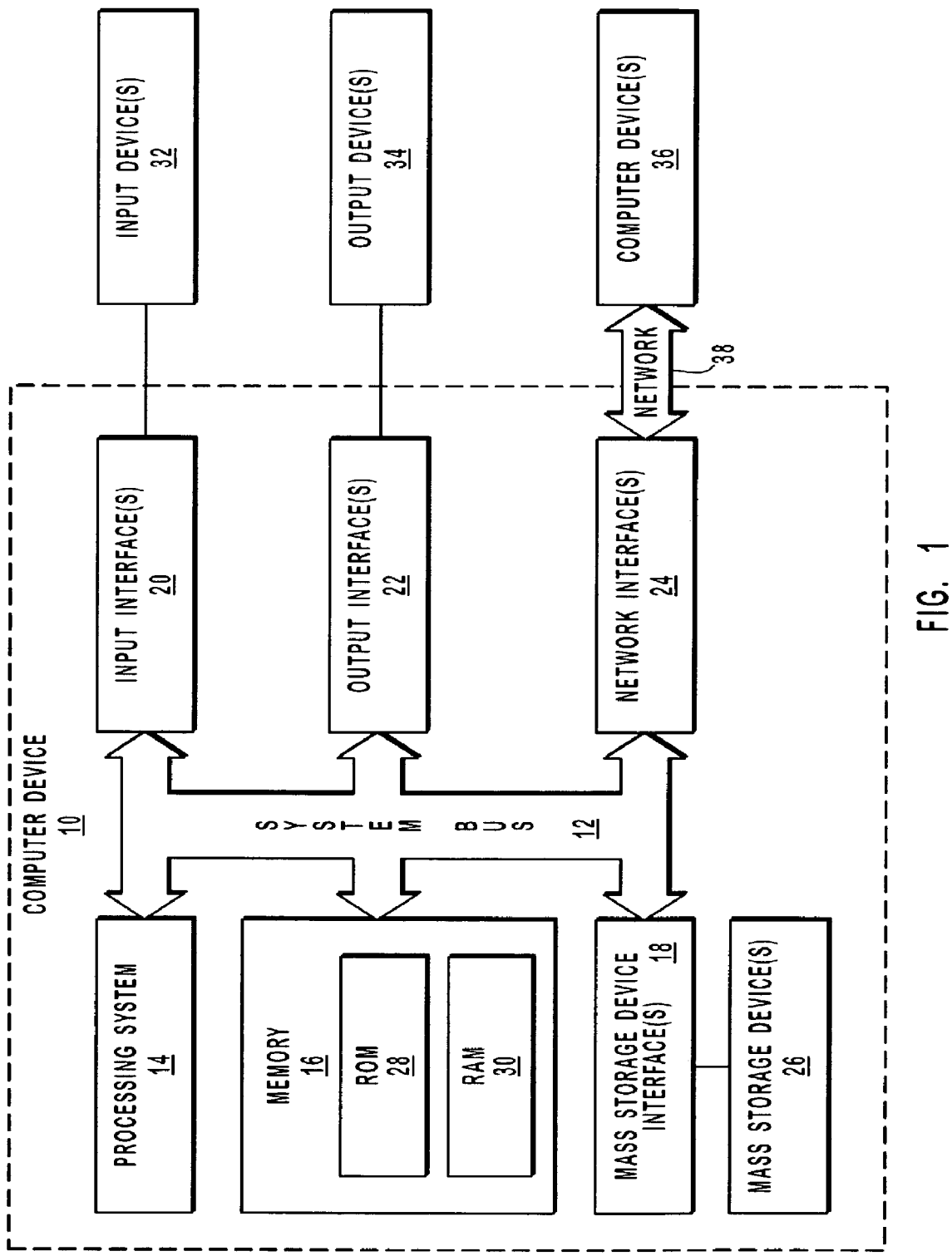
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device.

Furthermore, in a networked system computer device 10 may participate in a distributed computing environment, where functions or tasks are performed by a plurality of networked computer devices.

Figure 2:
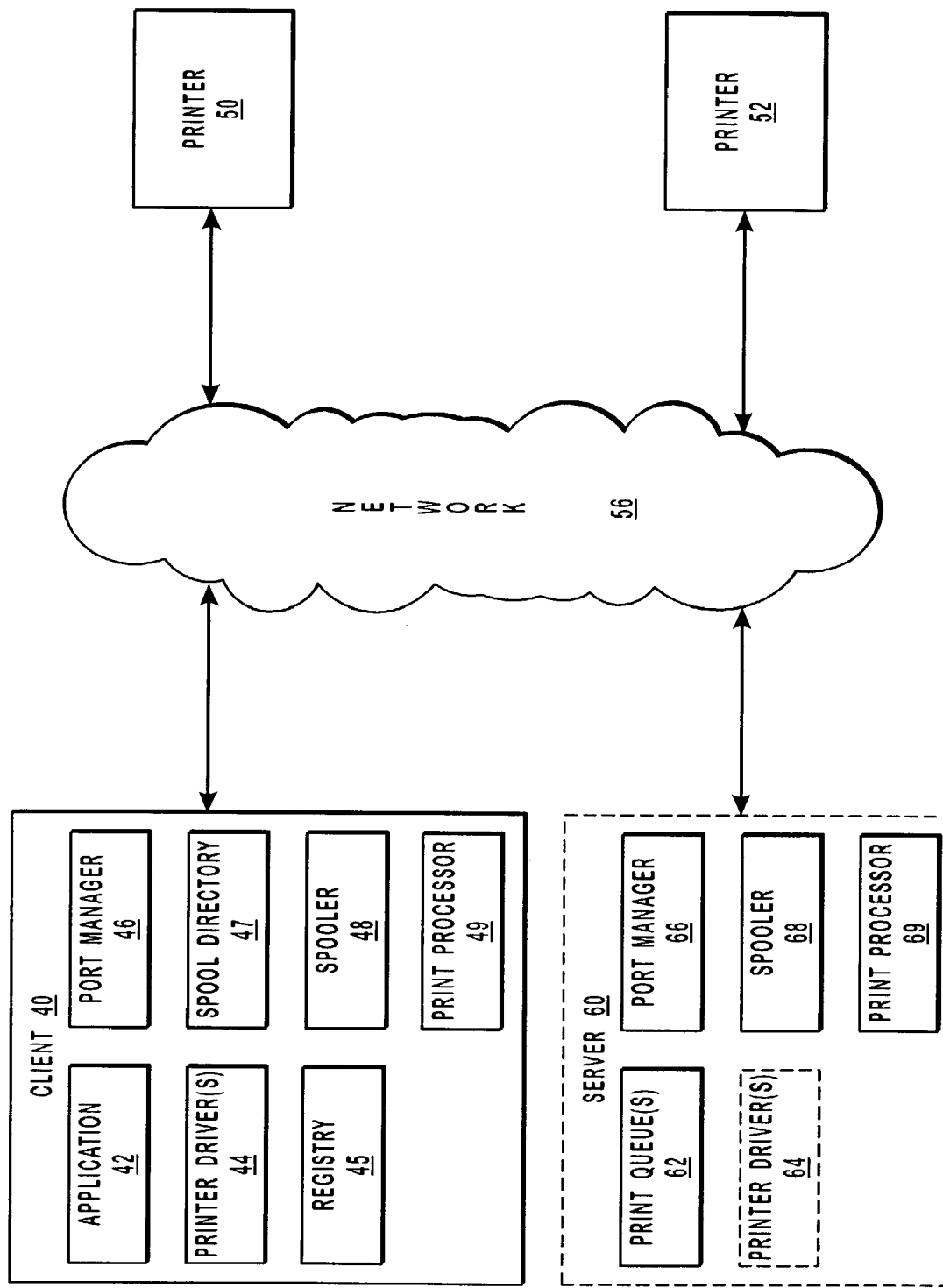
FIG. 2 illustrates a representative printing system configuration.

While those skilled in the art will appreciate that embodiments of the present invention may be practiced in a variety of different environments with many types of computer system configurations, FIG. 2 represents a representative networked system configuration that may be used in association with the present invention. While FIG. 2 illustrates an embodiment that includes a client, two printers, and optionally a print server connected to a network, alternative embodiments include more than one client, more than two printers, no server, and/or more than one server connected to a network. Other embodiments of the present invention include local, networked, or peer-peer printing environments where one or more computer devices are locally connected to a plurality of printing devices. In at least some embodiments, a time-to-availability attribute is supported at a client, at a server, or by printer firmware. Moreover, embodiments in accordance with the present invention also include wireless networked environments, or where the network is a wide area network, such as the Internet.

The representative system of FIG. 2 includes a computer device, illustrated as client 40, which is connected to a plurality of printing devices (printing devices 50 and 52) across network 56. In FIG. 2, printers 50 and 52 each include printing capabilities. In one embodiment, the capabilities of printer 50 are heterogeneous to the capabilities of printer 52 (e.g., at least one of the capabilities of printer 50 are different from the capabilities of printer 52). In another embodiment, the capabilities of printer 50 are homogeneous to the capabilities of printer 52.

While printers 50 and 52 are connected to network 56, embodiments of the present invention embrace the use of printing devices that are locally connected to a computer device, that are configured in a peer-to-peer printing environment, or that are configured in a wireless network environment. Further, the printing devices may be one or more multifunction printers MFPs, or facsimile devices.

In the illustrated embodiment, client 40 includes a software application 42, one or more print drivers 44, a registry 45, a port manager 46, a spool directory 47, a spooler 48, and a print processor 49. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, a high capacity, continuous or high utilization printing environment is provided. In at least some embodiments, a computer based printing system is provided that includes a printer driver, a print processor, a print spooler, one or more printers, optionally a printer server, and means for initiating one or more print jobs in a local, networked or remote printing environment, wherein the print jobs are balanced across a plurality of printing devices according to the time to availability of each printing device, as will be further explained below.

Providing Load Balancing of Print Jobs

As provided above, the present invention relates to load balancing print jobs across multiple printing devices. In particular, the present invention relates to systems and methods for providing a time-to-availability attribute for use in a variety of printing environments to dynamically manage the load balancing of print jobs across multiple printing devices, wherein the attribute is supported on the client side, on the server side, or by printer firmware, and wherein the attribute is implemented in a printer driver, a print processor, a spooler, a print server, a printer firmware spooler, or another component of a print subsystem.

Print jobs may include all or part of one or more documents, wherein each document may include one or more pages. Furthermore, the print jobs may include one or more copies of documents. Print jobs may be initiated from an application or by an automated or background process. A user may manually initiate the print jobs. Alternatively, print jobs may be automatically initiated.

Upon initiation, a user may select a command or sequence of commands and/or otherwise provide stimulus to a computer device to indicate an intention to despool print data corresponding to a print job to a printing device. The user may additionally select to split the print job, or copies thereof, across a group of printers (i.e., cluster printing) or to utilize a printer with the greatest preference in a group of printers (i.e., intelligent routing).

In accordance with embodiments of the present invention, a time-to-availability attribute for each printer is used in printing environments to load balance a sequence of one or more print jobs, initiated at one or more computer devices, wherein the print job(s) are balance across a plurality of printing devices to produce the maximum throughput and minimum time to completion. Examples of printing environments include local printing environments, networked printing environments, remote printing environments, and other types of printing environments. Furthermore, embodiments of the present invention embrace the use of the time-to-availability attribute in combination with cluster printing, intelligent routing and other processes.

Figure 3A:
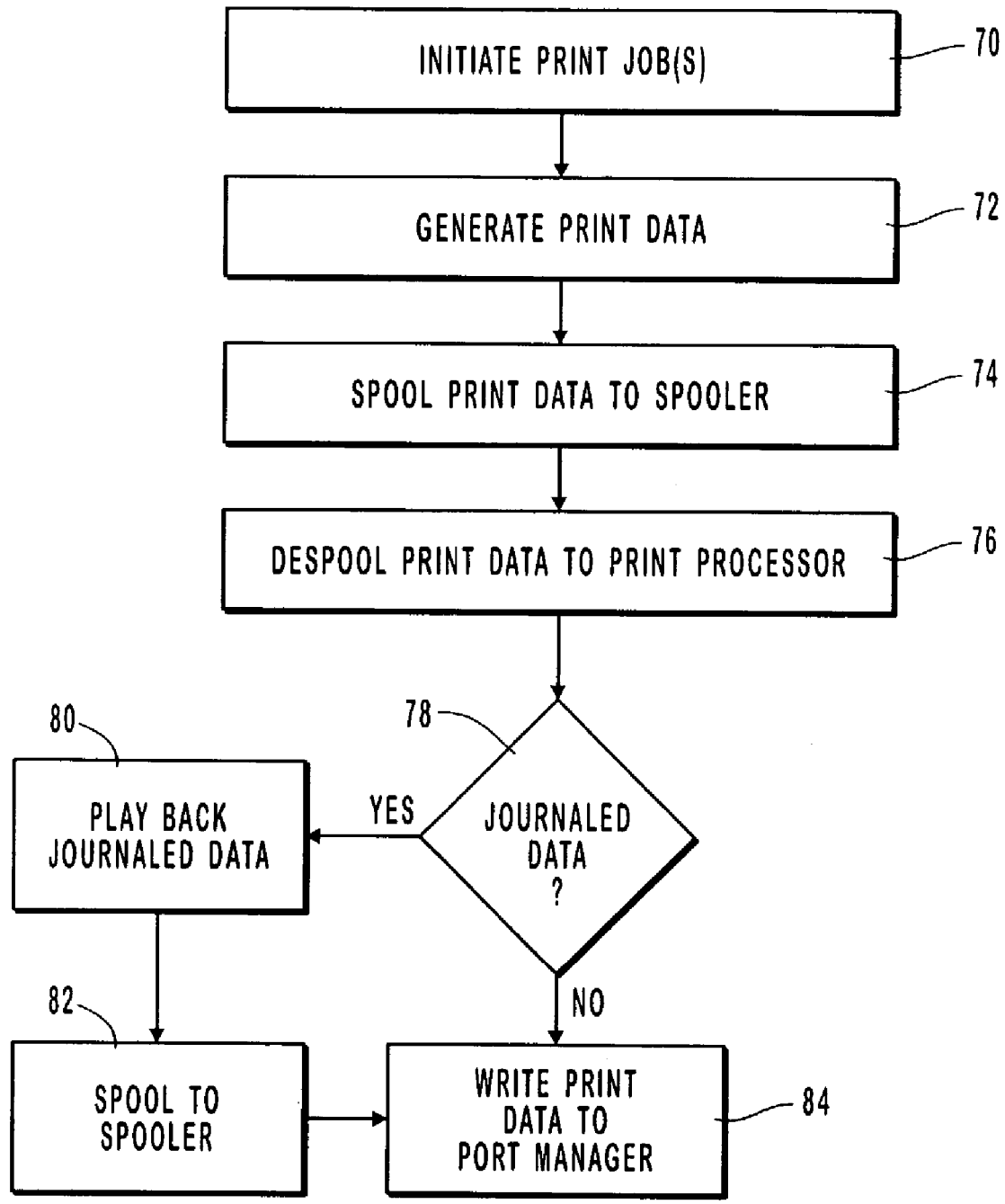
FIGS. 3A-3B is a flowchart that provides representative processing for load balancing of print jobs across multiple printing devices in a representative local printing environment.
Figure 3B:
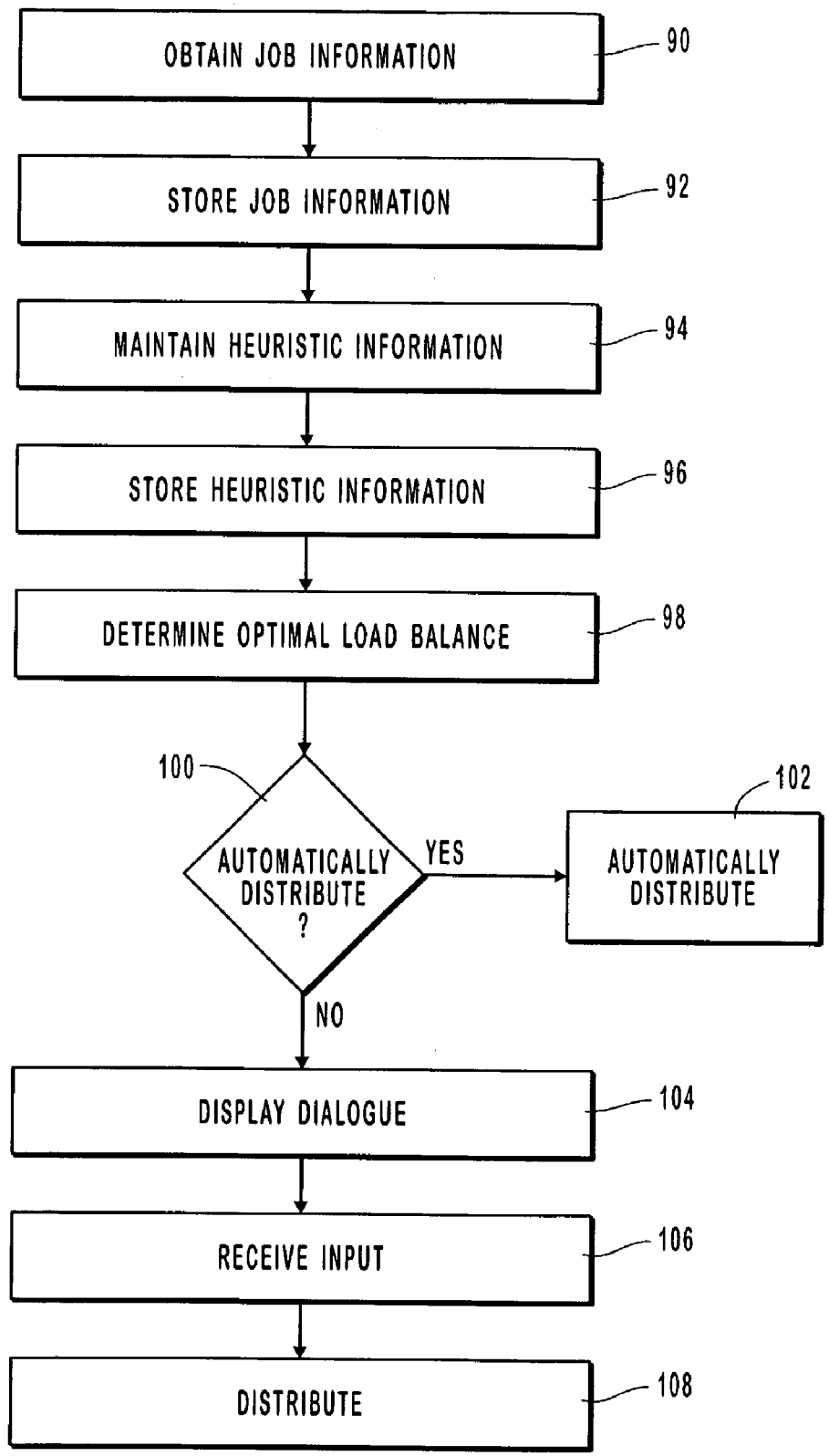

With reference now to FIGS. 3A-3B, flowcharts are provided that illustrate representative processing for load balancing print jobs across multiple printing devices in a representative local printing environment. Reference is first made to embodiments of the present invention wherein printer driver based load balancing technology is performed in a local printing environment.

In FIG. 3A, execution begins at step 70, where one or more print jobs are initiated. During initiation of the print job(s), the user may choose to despool one or more print jobs to a local printing device, wherein one or more printing devices are connected to the local printing device. For example, the connected printing devices may be connected via bi-directional parallel ports or as a chain of printers on a single bi-directional parallel port. Alternatively, the printing devices may be connected via multiple serial ports or SCSI ports.

At step 72, a printer driver that is associated with the printing device(s) generates print data. In an alternative embodiment, the printer driver may be embedded within an application that is compatible with the printing device(s). The printer driver may generate journaled data (e.g., EMF) for deferred rendering (i.e., playback), PDL data (e.g., Postcript, PCL, PDF) for deferred rendering (i.e., firmware interpretation), or rasterised data (i.e., ready for the printer's marking engine).

At step 74, the printer driver spools the print data to a spooler for immediate or later despooling. The spooler may store or buffer the print data on disk, memory or another storage device. For example, in the Microsoft® family of operating systems, the print data is stored in spool data files in a spool directory.

At step 76, the spooler despools the print data to a print processor. A decision is then made at decision block 78 as to whether or not the print data is journaled data. If the print data is journaled data, execution proceeds to step 80, where the print processor plays back the journaled data to the printer driver to render into printer data. At step 82, the printer driver spools the printer ready data to the spooler. At step 84, the spooler writes the printer ready data directly to port manager(s) of the associated printer(s). Alternatively, if it is determined at decision block 78 that the print data is not journaled data, the print data is rendered data (either raster or PDL) and execution proceeds directly to step 84, where the print processor writes the print data directly to the port manager(s) of the associated printer(s).

With reference now to FIG. 3B, the printer driver at step 90 produces additional information about each print job to facilitate the load balancing of each print job. The job information relates to estimating the amount of time to print the print job on a specified printer. Examples of such information include the printer name and page per minute ("PPM") rate, the number of pages of the print job, the size of spool data, whether the data is rasterized, sheet assembly options (e.g., duplex, N-up, etc.), and the like. The job information also contains heuristic information specific to the print job(s), such as the status of the print job (e.g., waiting, despooling, error state and done), the actual time to complete, etc.

At step 92, the job information is stored separately from the print data, and may be stored on disk, in memory, a registry or a database. For example, on the Microsoft® family of operating systems, the job information may be stored on disk in the spool directory.

As indicated at step 94, the printer driver also maintains heuristic information (i.e., accumulative statistical information for estimating subsequent print jobs). For example, in the Microsoft® family of operating systems, the heuristic information may be stored in a registry under a key associated with the specified printer. By way of example, the heuristic information includes accumulative information for estimating the actual performance of the printer under various print modes, such as journaled, PDL and rasterized data, simplex and duplex printing and average data size per page. For example, a printer may perform at its top PPM speed when the data is fully rasterised and in simplex mode, but may perform substantially slower when rendering bitmap intensive PDL data in duplex mode. It is not uncommon that a 25-PPM color printer may perform at 10-PPM or less in such a situation.

At step 98, the printer driver uses the accumulative performance information about the specified printer(s), the characteristics of the print job, the current status of the printer(s), and the current status of the print job(s) despooled/queued to the printer(s) to determine the most optimal load balance amongst a group of printers. In the illustrated embodiment, a determination is then made at decision block 100 as to whether or not the one or more print jobs are to be automatically distributed. If it is determined at decision block 100 that the one or more print jobs are to be automatically distributed, execution proceeds to step 102 where the printer driver automatically distributes the print job(s).

Alternatively, if it is determined at decision block 100 that the one or more print jobs are not to be automatically distributed, execution proceeds to step 104 where the printer driver displays a dialog to a user with the optimal alternative and one or more less optimal alternatives for the user to select therefrom. At step 106 the user's selection is received. The one or more print jobs are then distributed at step 108 according to the input received by the user at step 106.

Thus, in one example the printing environment includes two printers (e.g., printer 1 and printer 2), and the current job information and heuristic information indicate that printer 1 is estimated to complete in 2 minutes (00:02:00) and that printer 2 is estimated to complete in 1 minute (00:01:00). Furthermore, the heuristic information indicates that the print job initiated by a user is estimated to take 1½ minutes ("Job 1") to render the print job. If printer 1 and printer 2 are of the same speed, the printer driver selects printer 2 as the most optimal printer to send Job 1, automatically sends Job 1 to printer 2, and updates the time to availability of printer 2 to 2½ minutes (00:02:30). When a subsequent print job ("Job 2") is despooled, the printer driver select printer 1 since it would now be available 30 seconds earlier than printer 2, automatically sends Job 2 to printer 1, and updates the time to availability of printer 1.

In the example above, if the existing print job on printer 2 actually completed in 45 seconds, then the printer driver updates the time to availability of printer 2 to complete at 00:02:15, increasing its preference in selection for time to availability.

In the example above, if the two printers are of different speeds, the size and estimated time to print per printer is calculated and additionally considered. For example, if the data is fully rasterised and is a simplex job of 10 pages, and printers 1 and 2 are respectively 10 and 20 PPM, it would be estimated that the print job would take 2 minutes on printer 1, completing at 00:04:00, and 1 minute on printer 2, completing at 00:02:00. The printer driver then selects printer 2, but unlike the above example, if another print job was received, the printer driver would again select printer 2 since it would still be available sooner, even with the two existing print jobs.

Reference is now made to embodiments of the present invention wherein spooler based load balancing technology is performed in a local printing environment. In this embodiment, with reference back to FIG. 3A, one or more print jobs are initiated at step 70. During initiation, the user chooses to despool one or more print job(s) to one or more local printing devices, wherein two or more printing devices are connected to the printing device. For example, the two or more printers may be connected to the computing device via two or more bi-directional parallel ports, or connected as a chain of printers on a single bi-directional parallel port. Other examples include multiple serial ports and SCSI ports.

At step 72, the print data is generated by a printer driver that is associated with the printing device(s). In an alternate embodiment, the printer driver may be embedded within an application that is compatible with the printing device(s). The printer driver may generate journaled data (e.g., EMF) for deferred rendering (i.e., playback), PDL data (e.g., Postscript, PCL, PDF) for deferred rendering (i.e., firmware interpretation), or rasterised data (i.e., ready for the printer's marking engine).

At step 74, the printer driver spools the print data to a spooler for immediate or later despooling. The spooler may store or buffer the print data on disk, in memory or on other storage device. For example, in the Microsoft® family of operating systems, the print data is stored in spool data files in a spool directory.

At step 76, the spooler despools the print data to a print processor. A decision is then made at decision block 78 as to whether or not the print data is journaled data. If the print data is journaled data, execution proceeds to step 80, where the print processor plays back the journaled data to the printer driver to render into printer data. At step 82, the printer driver spools the printer ready data to the spooler. At step 84, the spooler writes the printer ready data directly to port manager(s) of the associated printer(s). Alternatively, if it is determined at decision block 78 that the print data is not journaled data, the print data is rendered (either raster or PDL) and execution proceeds directly to step 84, where the print processor writes the print data directly to the port manager(s) of the associated printer(s).

With reference now to FIG. 3B, at step 90 the spooler derives additional information from the spool data about each print job to facilitate the load balancing of each print job. The spooler parses the spool data to determine the type of print data (i.e., journaled, PDL, or rasterised), the number of pages, average data size per page and the sheet assembly options (e.g., duplex, N-up).

At step 92, this job specific information is stored separately from the print data, and may be stored on disk, in memory, a registry or database. For example, on the Microsoft® family of operating systems, the job information is stored on disk in the spool directory. The spooler also maintains heuristic information (i.e., accumulative statistical information for estimating subsequent print jobs), as indicated by step 94. For example, on the Microsoft® family of operating systems, the heuristic information may be stored in the registry under the key associated with the specified printer.

The job information relates to estimating the amount of time to print the print job on a specified printer. This information includes the printer name, PPM, the number of pages, size of spool data, whether the data is rasterized, sheet assembly options such as duplex and N-up. The job information also includes heuristic information specific to the print job, such as the status of the print job (e.g., waiting, despooling, error state and done), and the actual time to complete.

In accordance with a variety of embodiments of the present invention, the spooler determines this information without parsing the entire spool data. For example, if the spool data is Microsoft®'s Enhanced Meta File format (i.e., EMF) on Windows® 95/98/Me, a spool index file is generated in addition to the spool data files. The spool index file, which is typically a fraction of the size of the spool data, contains an EMF page/path entry per page. The number of entries in this file corresponds to the number of pages. The spool index file includes a header record that includes a DEVMODE data structure. This structure includes fields specifying the sheet assembly options. Additionally, the file size of each spool file referenced by the spool index file can be summed to produce the entire data size of the print data. Thus, in accordance with this embodiment, all the necessary information can be derived without reading spool data.

If the spool data is Microsoft®'s Enhanced Meta File format (i.e., EMF) on Windows® NT/2K, the spool data file includes a linked list of file offsets to each page of spool data. Each link specifies the file offset to the start of the next page of spool data. At the next offset, the first record specifies the offset to the subsequent next page. By file seeking and reading the record at each file offset in the linked list of pages, one can sum up the number of pages. A spool header (shadow) file is generated in addition to the spool data file. The spool header file, which is typically a fraction of the size of the spool data, includes a DEVMODE data structure. This structure includes fields specifying the sheet assembly options. Additionally, the file size of the spool data file specifies the entire data size of the print data. Thus, under this embodiment all the information necessary can be derived with reading only a minimal amount of spool data.

If the spool data is a PDL format (e.g., PCL, Postcript, PDF), the beginning of the spool data file includes PJL commands or other job control commands in another standard or proprietary format that specify the sheet assembly options. Unlike the above formats, the entire spool data file is parsed to locate each page boundary and summed up the number of pages. Additionally, the file size of the spool data file specifies the entire data size of the print data.

The heuristic information maintained in step 94 includes accumulative information for estimating the actual performance of the printer under various print modes, such as journaled, PDL and rasterized data, simplex and duplex printing and average data size per page. For example, a printer may perform at its top PPM speed when the data is fully rasterised and in simplex mode, but may perform substantially slower when rendering bitmap intensive PDL data in duplex mode. It is not uncommon that a 25 PPM color printer would perform in 10 PPM or less in such a situation. At step 96, the heuristic information is preserved.

At step 98, the spooler uses the accumulative performance information about the specified printer(s), the characteristics of the print job, the current status of the printer(s), and the current status of the print job(s) despooled/queued to the printer(s) to determine the most optimal load balance amongst a group of printers. In the illustrated embodiment, a determination is made at decision block 100 as to whether or not the one or more print jobs are to be automatically distributed. If it is determined at decision block 100 that the one or more print jobs are to be automatically distributed, execution proceeds to step 102 where the spooler automatically distributes the print job(s).

Alternatively, if it is determined at decision block 100 that the one or more print jobs are not to be automatically distributed, execution proceeds to step 104 where the spooler displays a dialog to a user with the optimal alternative and one or more less optimal alternatives for the user to select therefrom. At step 106 the user's selection is received. The one or more print jobs are then distributed at step 108 according to the input received by the user at step 106.

Reference is next made to embodiments of the present invention wherein print processor based load balancing technology is performed in a local printing environment. With reference back to FIG. 3A, one or more print jobs are initiated at step 70. During initiation, the user chooses to despool one or more print job(s) to one or more local printing devices, wherein two or more printing devices are connected to the printing device. For example, the printers may be connected via two or more bi-directional parallel ports or connected as a chain of printers on a single bi-directional parallel port. Other examples include multiple serial ports, SCSI ports, and Apple Talk.

At step 72, a printer driver that is associated with the printing device(s) generates the print data. In an alternative embodiment, the printer driver may be embedded within an application that is compatible with the printing device(s). The printer driver may generate journaled data (e.g., EMF) for deferred rendering (i.e., playback), PDL data (e.g., Postcript, PCL, PDF) for deferred rendering (i.e., firmware interpretation), or rasterised data (i.e., ready for the printer's marking engine).

At step 74, the printer driver spools the print data to a spooler for immediate or later despooling. The spooler may store or buffer the print data on disk, memory or another storage device. For example, in the Microsoft® family of operating systems, the print data is stored in spool data files in a spool directory.

At step 76, the spooler despools the print data to a print processor. A decision is then made at decision block 78 as to whether or not the print data is journaled data. If the print data is journaled data, execution proceeds to step 80, where the print processor plays back the journaled data to the printer driver to render into printer data. At step 82, the printer driver spools the printer ready data to the spooler. At step 84, the spooler writes the printer ready data directly to port manager(s) of the associated printer(s). Alternatively, if it is determined at decision block 78 that the print data is not journaled data, the print data is rendered data (either raster or PDL) and execution proceeds directly to step 84, where the print processor writes the print data directly to the port manager(s) of the associated printer(s).

With reference now to FIG. 3B, at step 90 the print processor derives additional information from the spool data about each print job to facilitate the load balancing of each print job. In particular, the print processor parses the spool data to determine the type of print data (i.e., journaled, PDL, or rasterised), the number of pages, average data size per page and the sheet assembly options (e.g., duplex, N-up).

At step 92, the information is stored separately from the print data, and may be stored on disk, in memory, a registry or database. For example, on the Microsoft® family of operating systems, the job information may be stored on disk in the spool directory. At step 94, the print processor also maintains heuristic information (i.e., accumulative statistical information for estimating subsequent print jobs). The heuristic information is preserved at step 96. For example, on the Microsoft® family of operating systems, the heuristic information may be stored in a registry under the key associated with the specified printer.

The job information includes information for estimating the amount of time to print the print job on a specified printer. For example, this information includes include the printer name and PPM, the number of pages, size of spool data, whether the data is rasterized, sheet assembly options such as duplex and N-up. The job information also includes heuristic information specific to the print job, such as the status of the print job (e.g., waiting, despooling, error state and done), and the actual time to complete.

In some embodiments, the print processor determines the information without parsing the entire spool data. For example, if the spool data in Microsoft®'s Enhanced Meta File format (i.e., EMF) on Windows® 95/98/Me, a spool index file is generated in addition to the spool data files. The spool index file, which is typically a fraction of the size of the spool data, contains an EMF page/path entry per page. The number of entries in this file corresponds to the number of pages. Correspondingly, the spool index file includes a header record that includes a DEVMODE data structure. This structure includes fields specifying the sheet assembly options. Additionally, the file size of each spool file referenced by the spool index file can be summed up to product the entire data size of the print data. Thus, under this embodiment, all the necessary information can be derived without reading a single byte of spool data.

If the spool data is Microsoft®'s Enhanced Meta File format (i.e., EMF) on Windows® NT/2K, the spool data file includes a linked list of file offsets to each page of spool data. Each Link specifies the file offset to the start of the next page of spool data. At the next offset, the first record specifies the offset to the subsequent next page. By file seeking and reading the record at each file offset in the linked list of pages, the number of pages can be summed. A spool header (shadow) file is generated in addition to the spool data file. The spool header file, which is typically a fraction of the size of the spool data, includes a DECMODE data structure that includes fields specifying the sheet assembly options. Additionally, the file size of the spool data file specifies the entire data size of the print data. Thus, under this embodiment, all the necessary information can be derived with reading only a minimal of spool data.

If the spool data is a PDL format (e.g., PCL, Postcript, PDF), the beginning of the spool data file includes PJL commands or other job control commands in another standard or proprietary format that specify sheet assembly options. Unlike the above formats, the entire spool data file is parsed to locate each page boundary and summed up the number of pages. Additionally, the file size of the spool data file specifies the entire data size of the print data.

The heuristic information includes accumulative information for estimating the actual performance of the printer under various print modes, such as journaled, PDL and rasterized data, simplex and duplex printing and average data size per page. For example, a printer may perform at its top PPM speed when the data is fully rasterised and in simplex mode, but may perform substantially slower when rendering bitmap intensive PDL data in duplex mode. It is not uncommon for a 25 PPM color printer to perform at 10 PPM or less in such a situation.

At step 98, the print processor uses the accumulative performance information about the specified printer(s), the characteristics of the print job, the current status of the printer(s), and the current status of the print job(s) despooled/queued to the printer(s) to determine the most optimal load balance amongst a group of printers. In the illustrated embodiment, a determination is then made at decision block 100 as to whether or not the one or more print jobs are to be automatically distributed. If it is determined at decision block 100 that the one or more print jobs are to be automatically distributed, execution proceeds to step 102 where the print processor automatically distributes the print job(s).

Alternatively, if it is determined at decision block 100 that the one or more print jobs are not to be automatically distributed, execution proceeds to step 104 where the print processor displays a dialog to a user with the optimal alternative and one or more less optimal alternatives for the user to select therefrom. At step 106 the user's selection is received. The one or more print jobs are then distributed at step 108 according to the input received by the user at step 106.

Figure 4A:
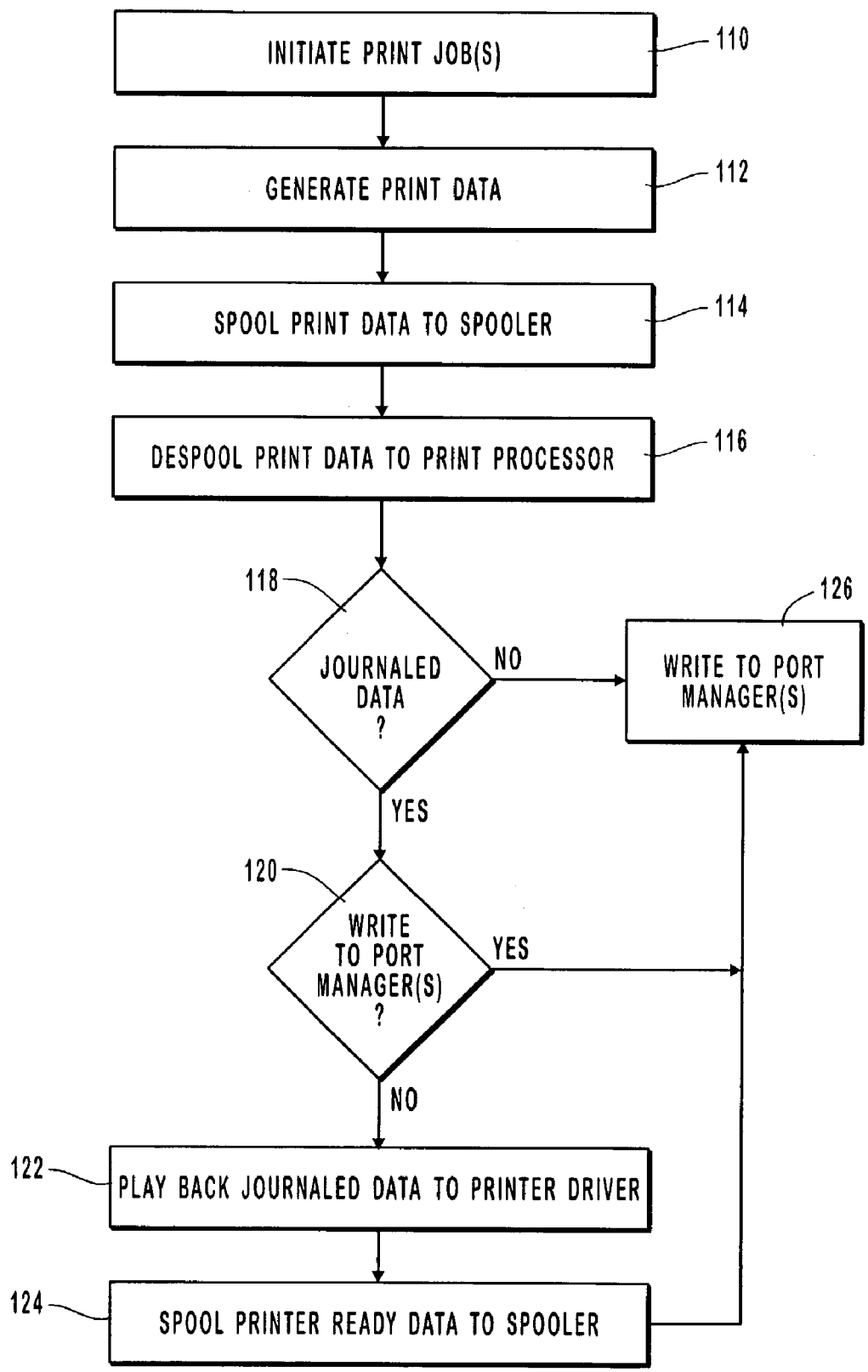
FIGS. 4A-4C are flowcharts that provide representative processing for load balancing of print jobs across multiple printing devices in a representative shared network printing environment.
Figure 4B:
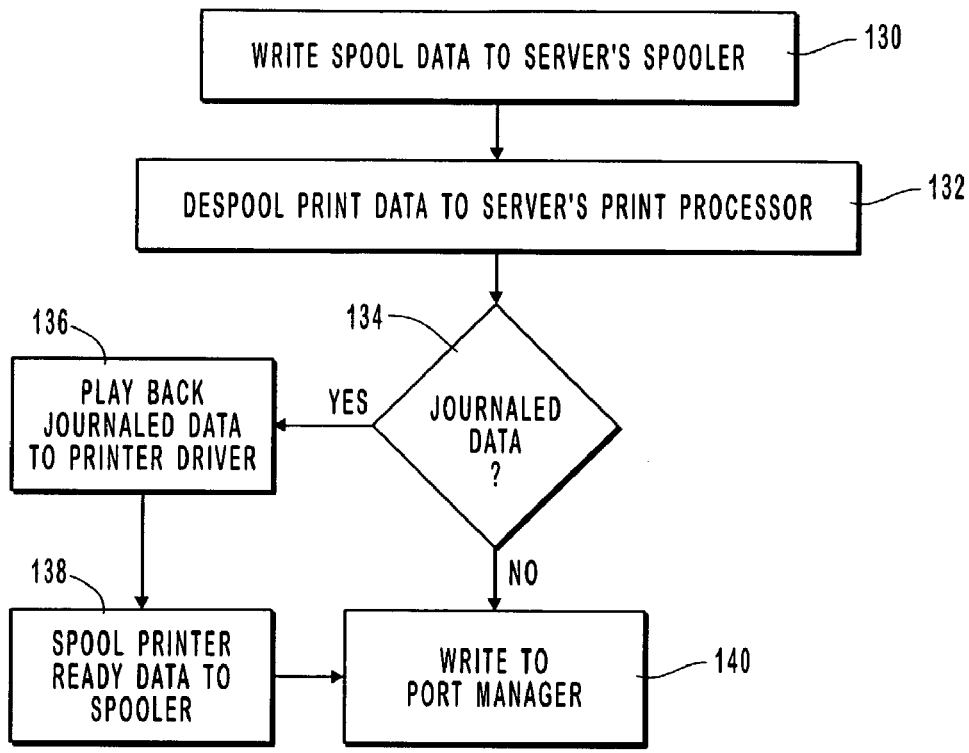
Figure 4C:
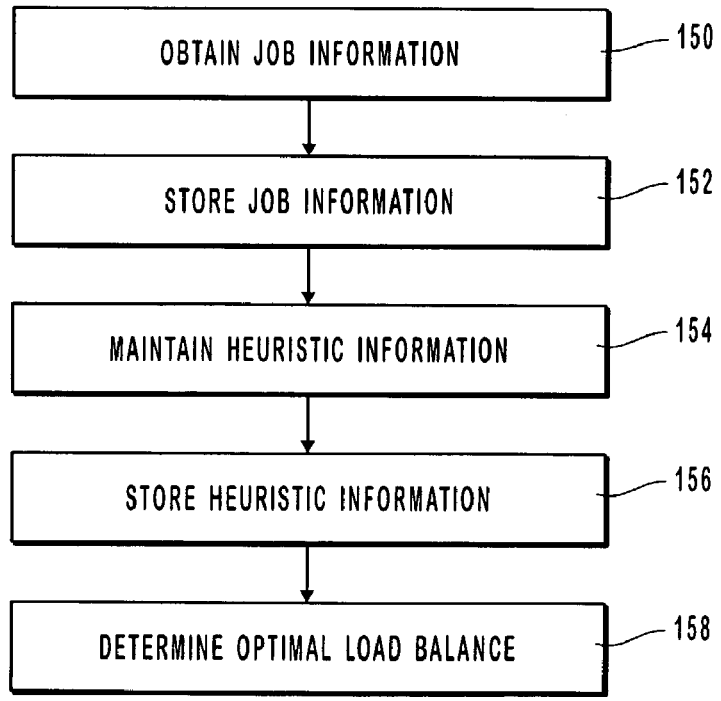

With reference now to FIGS. 4A-4C, flowcharts are provided that illustrate representative processing for load balancing of print jobs across multiple printing devices in a representative shared network printing environment. Reference is first made to embodiments of the present invention wherein client based load balancing technology is performed in a shared network printing environment.

In FIG. 4A, one or more print jobs are initiated at step 110. During initiation, the user chooses to despool one or more print jobs to one or more shared network printing devices, wherein two or more printing devices are connected to one or more print servers. For example, the two or more printers have a print queue associated with each printer on a print server. The printers may be connected locally to the print server, or may be on a network, wherein the print server despools print data to the printer over the network by a network communication/data transmission means, such as TCP/IP, NetWare, HTTP, a proprietary protocol, or the like.

At step 112, a printer driver that is associated with the printing device(s) generates the print data. In an alternative embodiment, the printer driver may be embedded within an application that is compatible with the printing device(s). The printer driver may generate journaled data (e.g., EMF) for deferred rendering (i.e., playback), PDL data (e.g., Postscript, PCL, PDF) for deferred rendering (i.e., firmware interpretation), or rasterised data (i.e., ready for the printer's marking engine).

At step 114, the printer driver spools the print data to the spooler for immediate or later despooling. The spooler may store or buffer the print data on disk, memory or other storage device. For example, in the Microsoft® family of operating systems, the print data is stored in spool data files in a spool directory.

At step 116, the spooler despools the print data to the print processor. A decision is then made at decision block 118 as to whether or not the print data is journaled data. If the print data is journaled data, execution proceeds to decision block 120 for a determination as to whether or not to write the journaled data directly to the port manager(s) for deferred rendering on a print server. If it is determined at decision block 120 to not write the journaled data directly to the port manager(s) for deferred rendering on a print server, execution proceeds to step 122, where the print processor plays back the journaled data to the printer driver to render into printer data. At step 1242, the printer driver spools the printer ready data to the spooler. At step 126, the spooler writes the printer ready data directly to port manager(s) of the associated printer(s).

Alternatively, if it is determined at decision block 118 that the print data is not journaled data, the print data is rendered data (either raster or PDL) and execution proceeds directly to step 126, where the print processor writes the print data directly to the port manager(s) of the associated printer(s).

Alternatively, if it is determined at decision block 120 to write the journaled data directly to the port managers(s), execution proceeds directly to step 126, wherein the print processor writes the journaled data directly the port manager(s) of the associated print queue(s) of the associated printer (s), for deferred rendering on the print server.

With reference now to FIG. 4B, at a later point the printer server writes the spool data from the print queue to the server's spooler, as indicated at step 130. At step 132, the server's spooler then despools the print data to the server's print processor. A determination is then made at decision block 134 as to whether or not the print data is journaled. If the print data is journaled data, at step 136 the server's print processor plays back the journaled data to a compatible printer driver on the server to render into printer ready data. At step 138, the printer driver on the server then spools the printer ready data to the server's spooler, which writes the printer ready data directly to the Server's port manager(s) of the associated printer(s) as indicated at step 140. Alternatively, if it is determined at decision block 134 that the print data is rendered data (either raster or PDL), the server's print processor writes the print data directly to the server's port manager(s) of the associated printer(s) at step 140.

With reference now to FIG. 4C, the job information is obtained at step 150 and stored at step 152. The heuristic information is maintained at step 154 and stored at step 156. In at least some embodiments of the present invention, the job information and heuristic information files are stored on the print server instead of on the client. The heuristic information file is maintained and updated by the printer server. The job information may be generated either on the client side or on the server side. In both cases, the client queries the printer server for job information on all of the queued jobs of the specified printer(s) or printer cluster(s). The client processes the job information to select the desired load balance across one or more printer(s) or printer cluster (s), as indicated at step 158.

In one embodiment of the present invention, the client generates the job information and provides the information to the spool data file that is despooled to the corresponding print queue on the print server. The print server then extracts and strips off the job information from the spool data prior to despooling to the corresponding printer(s) or printer cluster(s) and stores the information. In an alternative embodiment, the job info is in commentary format compatible with the printer ready data and does not need to be stripped off. For example, the job information may be in the following PJL comment syntax:

@PJL COMMENT PRINTER=PRINTER 1
@PJL COMMENT PPM=10
@PJL COMMENT NPAGES=12
@PJL COMMENT SPOOLSIZE=2 MB
@PJL COMMENT RASTER=FALSE

Embodiments of the present invention allow for the extraction of the job information and the maintaining and updating of the heuristic information to be performed either by the server's spooler or the server's print processor. In an alternative embodiment, the server generates the job information.

Reference is now made to embodiments of the present invention wherein server based load balancing technology is performed in a shared network printing environment. With reference to back to FIG. 4A, one or more print jobs are initiated at step 110. During initiation, the user chooses to despool one or more print jobs to one or more shared network printing devices, wherein two or more printing devices are connected to one or more print servers. For example, the two or more printers have a print queue associated with each printer on a print server. The printers may be connected locally to the print server or may be on a network, wherein the print server can despool print data to the printer over the network by a network communication/ data transmission means such as TCP/IP, NetWare, HTTP, a proprietary protocol, etc.

At step 112, a printer driver that is associated with the printing device(s) generates the print data. In an alternative embodiment, the printer driver may be embedded within an application that is compatible with the printing device(s). The printer driver may generate journaled data (e.g., EMF) for deferred rendering (i.e., playback), PDL (e.g., Postscript, PCL, PDF) for deferred rendering (i.e., firmware interpretation), or rasterised (i.e., ready for the printers marking engine).

At step 114, the printer driver spools the print data to the spooler for immediate or later despooling. The spooler may store or buffer the print data on disk, memory or another storage device. For example, in the Microsoft® family of operating systems, the print data is stored in spool data files in a spool directory.

At step 116, the spooler despools the print data to the print processor. A determination is then made at decision block 118 as to whether or not the print data is journaled. If the print data is journaled data, a determination is made at decision block 120 as to whether or not to write the journaled data directly to the port manager(s). If the journaled data is not to be written directly to the port manager(s), at step 122 the print processor may immediately play back the journaled data to the printer driver to render into printer ready data. At step 124, the printer driver then spools the printer ready data to the spooler, which writes the printer ready data directly to the port manager(s) of the associated print queue(s) of the associated printer(s) at step 126.

Alternatively, if it is determined at decision block 118 that the print data is rendered data (either raster or PDL), the print processor writes the print data directly to the port manager(s) of the associated print queue(s) of the associated printer(s) at step 126.

Alternatively, if it is determined at decision block 120 that the journaled print data is to be written directly to the port manager(s), the print processor writes the journaled data directly to the port manager(s) of the associated print queue(s) of the associated printer(s) at step 126 for deferred rendering on the print server.

With reference now to FIG. 4B, at a later point, the print server writes the spool data from the print queue to the server's spooler at step 130. The server's spooler then despools the print data to the server's print processor at step 132. A determination is then made at decision block 134 as to whether or not the print data is journaled. If the print data is journaled data, at step 136 the server's print processor plays back the journaled data to a compatible printer driver on the server to render into printer ready data. At step 138, the printer driver on the server then spools the printer ready data to the server's spooler, which writes the printer ready data directly to the server's port manager(s) of the associated printer(s) at step 140. Alternatively, if it is determined at decision block 134 that the print data is rendered data (either raster or PDL), the server's print processor writes the print data directly to the Server's port manager(s) of the associated printer(s) at step 140.

With reference now to FIG. 4C, job information is obtained at step 150 and stored at step 152. Heuristic information is maintained at step 154 and stored at step 156. In some embodiments, the job information and the heuristic information files are stored on the print server instead of on the client. The heuristic information file is maintained and updated by the printer server. The job information may be generated either on the client side or server side. In both cases, the server processes the job information to select the desired load balance across one or more printer(s) or printer cluster(s) at step 158, and sends a message back to the client indicating the selected distribution.

In some embodiments of the present invention, a client generates the job information and provides the information to the spool data file that is despooled to the corresponding print queue on the print server. The printer server then extracts and strips off the job information from the spool data prior to despooling to the corresponding printer(s) or printer cluster(s) and stores the information. In an alternative embodiment, the job information is in a commentary format compatible with the printer ready data and does not need to be stripped off. For example, the job information may be in the following PHL comment syntax:

@PJL COMMENT PRINTER=PRINTER 1
@PJL COMMENT PPM=10
@PJL COMMENT NPAGES=12
@PJL COMMENT SPOOLSIZE=2 MB
@PJL COMMENT RASTER=FALSE

In one embodiment, the extraction of the job information and the maintaining and updating of the heuristic information may be performed either by the server's spooler or the server's print processor. In another embodiment, the server generates the job information.

Figure 5A:
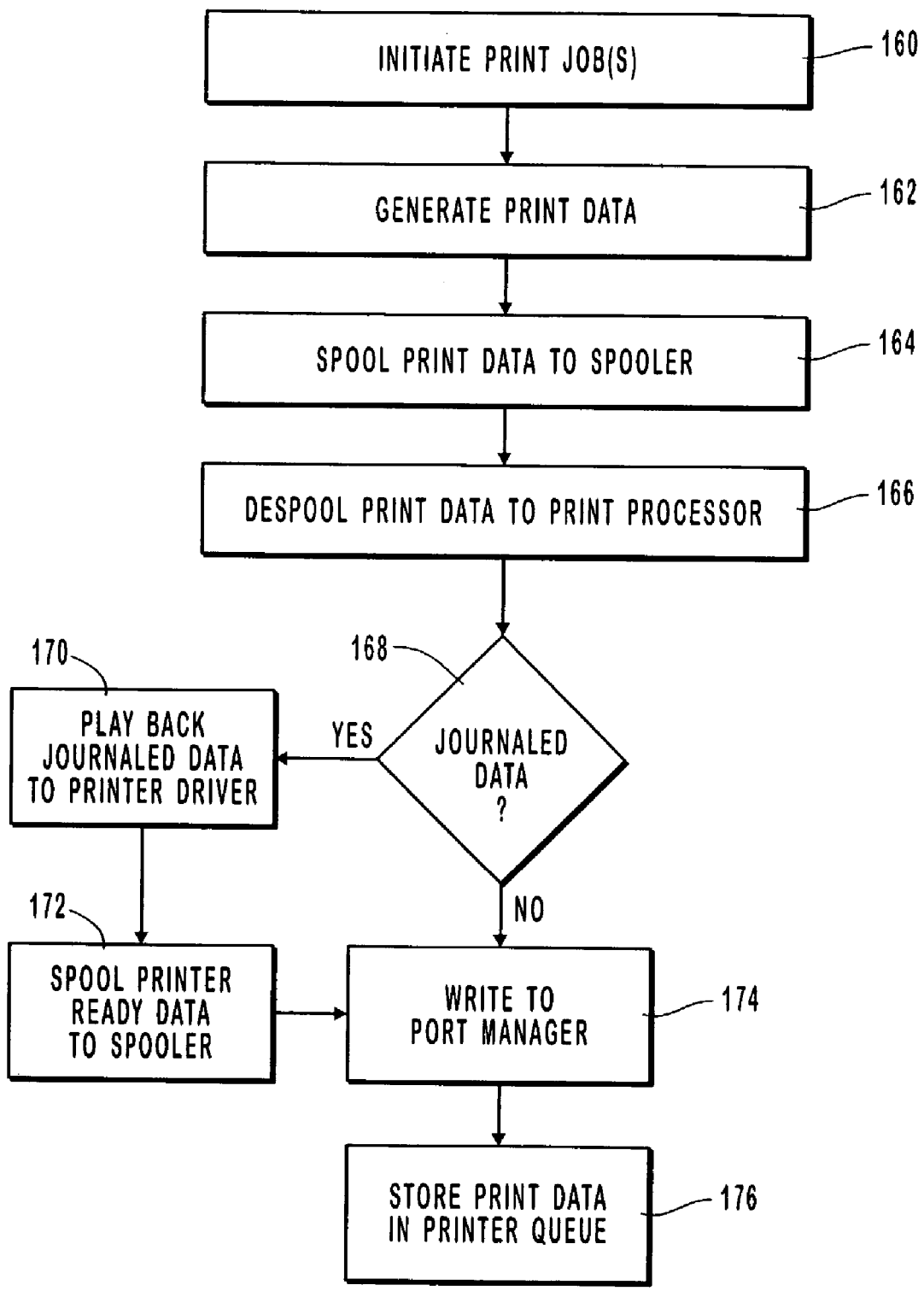
FIGS. 5A-5C are flowcharts that provide representative processing for load balancing of print jobs across multiple printing devices in a representative remote printing environment.
Figure 5B:
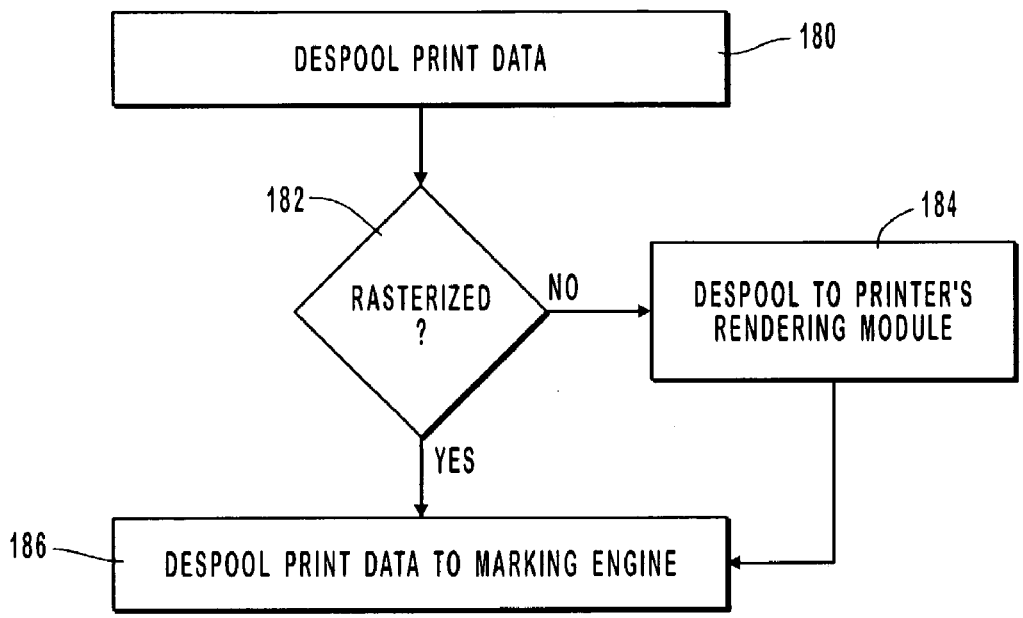
Figure 5C:
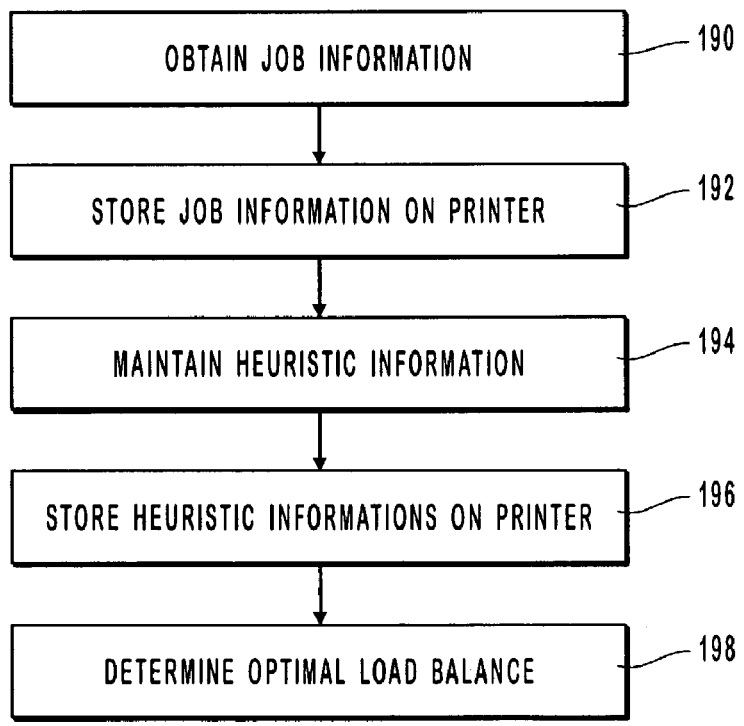

FIGS. 5A-5C are flowcharts that provide representative processing for load balancing of print jobs across multiple printing devices in a representative remote printing environment. Reference is made to embodiments of the present invention wherein firmware based load balancing technology is performed in a remote printing environment.

With reference to FIG. 5A, a user initiates one or more print jobs at step 160. During initiation, the user chooses to despool one or more print job(s) to one or more remote printing devices (i.e., peer-peer), wherein two or more printing devices are connected to a local (i.e., LAN) or a wide area network (i.e., WAN), and wherein each printing device is capable of queuing and despooling print data to the rendering and/or marking engine of the printing device from within the printer's firmware. The computing device and printers utilize communication/data transmission means for connecting and transmitting the print data, such as TCP/IP, Netware, HTTP, or a proprietary protocol.

At step 162, a printer driver that is associated with the printing device(s) generates the print data. In an alternative embodiment, the printer driver may be embedded within an application that is compatible with the printing device(s). The printer driver generates journaled data (e.g., EMF) for deferred rendering (i.e., playback), PDL data (e.g., Postscript, PCL, PDF) for deferred rendering (i.e., firmware interpretation), or rasterised data (i.e., ready for the printer's marking engine).

At step 164, the printer driver spools the print data to the Spooler for immediate or later despooling. The spooler may store or buffer the print data on disk, memory or another storage device. For example, in the Microsoft® family of operating systems, the print data is stored in spool data files in a spool directory.

At step 166, the spooler despools the print data to a print processor. A determination is then made at decision block 168 as to whether or not the print data is journaled. If the print data is journaled data, the print processor plays back the journaled data to the printer driver at step 170 to render into printer ready data. At step 172, the printer driver spools the printer ready data to the spooler, which writes the printer ready data directly to the port manager(s) of the associated printer(s) at step 174. Alternatively, if it is determined at decision block 168 that the print data is rendered data (either raster or PDL), the print processor writes the print data directly to the port manager(s) of the associated printer(s) at step 174. At step 176, the print data is then stored in the printer's print queue.

With reference now to FIG. 5B, at a later point, as illustrated by step 180, the printer's firmware despools the print data. A determination is then made at decision block 182 as to whether the print data is rasterized. If the print data is rasterised, the print data is despooled to the printer's marking engine at step 186. Otherwise, the print data is despooled to the printer's rendering module at step 184 to render into rasterised data, which is then sent to the marking engine at step 186.

In the present embodiment of the invention, the job information and the heuristic information files are stored on the printer instead of on the client. Thus, as illustrated in FIG. 5C, the job information is obtained at step 190 and stored on the printer at step 192. The heuristic information file is maintained at step 194, stored on the printer at step 196, and updated by the printer's firmware. The job information may be generated either on the client or by the printer firmware. In one embodiment, the job information is stored as a job MIB in the SNMP protocol. Examples of other representations and protocols include IPP and HTTP. In both embodiments, the client queries the printer(s) (e.g., SNMP, IPP, HTTP) for job information on all the queued jobs of the specified printer(s) or printer cluster(s). The client processes the job information in the aforementioned manner to select the desired load balance across one or more printer(s) or printer cluster(s).

In one embodiment of the present invention, the client generates the job information and provides the information to the spool data file that is despooled to the corresponding print queue(s) on the printer(s) or printer cluster(s). The printer's firmware extracts and strips off the job information from the spool data prior to despooling to the rendering module (i.e., PDL) or marking engine (i.e., rasterised) and stores the information. In an alternative embodiment, the job information is in commentary format compatible with the printer ready data and does not need to be stripped off. In one embodiment, the job information is provided in the following PJL comment syntax:

@PJL COMMENT PRINTER=PRINTER 1
@PJL COMMENT PPM=10
@PJL COMMENT NPAGES=12
@PJL COMMENT SPOOLSIZE=2 MB
@PJL COMMENT RASTER=FALSE

In the present embodiment, the extraction of the job information and the maintaining and updating of the heuristic info is performed by the printer's firmware spooler. In an alternative embodiment, the printer's firmware generates the job information. At step 198 the optimal load balance is determined and followed.

Thus, as discussed herein, embodiments of the present invention embrace load balancing of print jobs across multiple printing devices. In particular, embodiments of the present invention relate to systems and methods for providing a time-to-availability attribute for use in a variety of printing environments to dynamically manage the load balancing of print jobs across multiple printing devices, wherein the attribute is supported on the client side, on the server side, or by printer firmware, and wherein the attribute is implemented in a printer driver, a print processor, a spooler, a print server, a printer firmware spooler, or another component of a print subsystem.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a printing environment that includes a plurality of printing devices, a method for balancing one or more print jobs across the printing devices to increase throughput of the print jobs, the method comprising the steps for:
   receiving a request to despool print data relating to one or more print jobs;
   obtaining job information during or after generation of the print data relating to each of the print jobs to enable a load balance of the print jobs across the printing devices, wherein the job information is preserved separately from the print data, and wherein at least a portion of the job information enables a determination as to an amount of time required for completion of each of the print jobs;
   maintaining heuristic information relating to a status and available characteristics of each of the printing devices to enable a load balance of the print jobs across the printing devices, wherein the heuristic information is preserved separately from the print data;
   using the job information and the heuristic information to determine an optimal load balance amongst the printing devices;
   selectively distributing the print jobs to the printing devices according to the optimal load balance; and
   rendering the print jobs.

2. A method as recited in claim 1, wherein the method is performed in one of:
   (i) a local printing environment;
   (ii) a networked printing environment; and
   (iii) a remote printing environment.

3. A method as recited in claim 1, wherein the step for maintaining heuristic information includes the steps for:
   electronically monitoring current use of the printing devices; and
   updating an estimation of current and subsequent print job completion.

4. A method as recited in claim 1, wherein the heuristic information includes accumulative statistical information for estimating subsequent print jobs.

5. A method as recited in claim 1, wherein the job information includes at least one of:
   (i) page per minute information relating to a print job;
   (ii) a number of pages corresponding to a print job;
   (iii) a size of spool data for a print job;
   (iv) whether the print data is rasterized;
   (v) one or more sheet assembly options for a print job;
   (vi) a status of a print job; and
   (vii) an actual time to complete a print job.

6. A method as recited in claim 1, wherein the step for selectively distributing is performed automatically.

7. A method as recited in claim 1, further comprising a step for generating the print data, and wherein one or more printer drivers perform the steps for generating the print data, obtaining the job information, maintaining the heuristic information, and using the job information and the heuristic information to determine the optimal load balance amongst the printing devices.

8. A method as recited in claim 1, further comprising a step for generating the print data, and wherein one or more spoolers perform the steps for generating the print data, obtaining the job information, maintaining the heuristic information, and using the job information and the heuristic information to determine the optimal load balance amongst the printing devices.

9. A method as recited in claim 8, further comprising a step for using the one or more spoolers to parse spool data to determine a type of the print data, a number of pages, an average data size per page, and sheet assembly options.

10. A method as recited in claim 1, further comprising a step for generating the print data, and wherein one or more print processors perform the steps for generating the print data, obtaining the job information, maintaining the heuristic information, and using the job information and the heuristic information to determine the optimal load balance amongst the printing devices.

11. A method as recited in claim 1, further comprising a step for preserving the job information and the heuristic information on a print server, and wherein the step for maintaining heuristic information is performed by the print server.

12. A method as recited in claim 1, wherein the job information and the heuristic information are preserved on one or more of the plurality of printing devices.

13. A method as recited in claim 12, wherein the step for maintaining heuristic information is performed by firmware of one or more of the printing devices.

14. A system that is configured to provide selective load balancing of print jobs across multiple printing devices, the system comprising:
- a computer device configured to initiate one or more print jobs, wherein the print jobs include corresponding print data;
- a plurality of printing devices connected to the computer device to selectively render the print jobs;
- job information corresponding to the print jobs, wherein the job information is preserved separate from the print data, and wherein at least a portion of the job information enables a determination as to an amount of time required for completion of each of the print jobs, wherein the job information is preserved on one of (i) the computer device and (ii) at least one of the plurality of printing devices; and
- heuristic information corresponding to a status and available characteristics of each of the printing devices to enable a load balance of the print jobs across the printing devices, wherein the heuristic information is preserved on one of (i) the computer device and (ii) at least one of the plurality of printing devices.

15. A system as recited in claim 14, wherein the computer device is locally connected to the plurality of printing devices.

16. A system as recited in claim 14, wherein the computer device is remotely connected to the plurality of printing devices.

17. A system as recited in claim 14, wherein the computer device is connected to the plurality of printing devices via a network.

18. A computer program product for implementing within a computer system a method for balancing one or more print jobs across the printing devices to increase throughput of the print jobs, the computer program product comprising:
- a computer readable medium storing a computer program code means utilized to implement the method, wherein the computer program code means is comprised of executable code for implementing the steps for:
  - receiving a request to despool print data relating to one or more print jobs;
  - obtaining job information during or after generation of the print data relating to each of the print jobs to enable a load balance of the print jobs across the printing devices, wherein the job information is preserved separately from the print data, and wherein at least a portion of the job information enables a determination as to an amount of time required for completion of each of the print jobs;
  - maintaining heuristic information relating to a status and available characteristics of each of the printing devices to enable a load balance of the print jobs across the printing devices, wherein the heuristic information is preserved separately from the print data;
  - using the job information and the heuristic information to determine an optimal load balance amongst the printing devices;
  - selectively distributing the print jobs to the printing devices according to the optimal load balance; and
  - rendering the print jobs.

19. A computer program product as recited in claim 18, wherein the step for maintaining heuristic information includes steps for:
- electronically monitoring current use of the printing devices; and
- updating an estimation of current and subsequent print job completion.

20. A computer program product as recited in claim 18, wherein the step for selectively distributing is performed automatically.

21. A computer program product as recited in claim 18, wherein the computer program code means is further comprised of executable code for implementing a step for generating the print data, and wherein the steps for generating the print data, obtaining job information, maintaining heuristic information, and using the job information and the heuristic information to determine an optimal load balance amongst the printing devices are performed by at least one of:
  (i) one or more printer drivers;
  (ii) one or more spoolers; and
  (iii) one or more print processors.

* * * * *